United States Patent [19]

Hall

[11] Patent Number: 5,377,010
[45] Date of Patent: Dec. 27, 1994

[54] AIR PATH BEAM COMBINING OPTICS FOR A RING LASER

[75] Inventor: David B. Hall, La Crescenta, Calif.

[73] Assignee: Litton Systems, Inc., Woodland Hills, Calif.

[21] Appl. No.: 455,082

[22] Filed: Dec. 22, 1989

[51] Int. Cl.$^5$ .......................... G01B 9/02; H01S 3/083
[52] U.S. Cl. ........................................ 356/350; 372/94
[58] Field of Search ........................... 372/94; 356/350

[56] References Cited

U.S. PATENT DOCUMENTS

| | | | |
|---|---|---|---|
| 3,480,878 | 11/1969 | Macek | 356/350 |
| 3,867,034 | 2/1975 | Aronowitz | 356/350 |
| 4,449,824 | 5/1984 | Matthews | 356/350 |
| 4,886,364 | 12/1989 | Ljung | 356/350 |

*Primary Examiner*—Stephen C. Buczinski
*Attorney, Agent, or Firm*—Poms, Smith, Lande & Rose

[57] ABSTRACT

An output beam combining apparatus for recombining diverging output beams from a ring laser. One preferred embodiment of the present invention includes a first planar mirror mounted to an exterior surface of a ring laser output mirror and having a reflective coating oriented generally perpendicular to the output mirror along with a second planar mirror disposed adjacent to the first mirror and having a reflective coating oriented perpendicular to the reflective plane of the first mirror. In use a first output beam from the ring laser is reflected back to the rear surface of the ring laser output mirror along a path parallel to but displaced from its initial path. This return beam is then reflected off of the rear surface of the output mirror along a path that is collinear with a second output beam from the ring laser so as to form a combined beam that is directed to a suitable detector.

12 Claims, 2 Drawing Sheets

AIR PATH BEAM COMBINING OPTICS FOR A RING LASER

BACKGROUND ART

The present invention relates to ring lasers and, more particular, output beam combining apparatus for forming a single beam from the two or more output beams of a ring laser.

Ring lasers have become widely used in a variety of applications, often related to the measurement of rotational motion and acceleration. The ring laser typically forms a closed polygonal optical path within which two laser beams propagate in opposing directions. This optical path may lie in a single plane (i.e., flat) but need not. Rotation of the ring laser causes a frequency shift in each of the counter propagating laser beams. The magnitude and direction of this rotation can be determined by combining the counter-propagating laser beams outside of the ring laser optical path and measuring a resulting beat frequency.

Ring lasers are usually made from a solid block of material having a series of intersecting bores to form the optical path. Several mirrors are disposed at the intersections of these bores to direct the laser beams about the optical path. Typically one of these mirrors allows a small amount of each laser beam to escape the ring laser so that the rotationally-induced beat frequency can be measured. This output mirror is usually formed by evaporating a partially reflective coating onto an interior surface of an optically transmissive substrate. Consequently, as the counter-propagating laser beams exit an exterior or rearward surface of the output mirror, the two beams are physically displaced and diverging. Output beam combining apparatus are normally used outside the ring laser structure to re-combine these diverging laser beams into a single beam and usually also redirects this beam to a suitable detector.

Conventional output beam combining apparatus typically include a retro-reflective device. Retro-reflectors possess the characteristic of reflecting a light beam parallel to, but displaced from, an incoming or incident light beam. The retro-reflector is oriented so as to direct one of the exiting laser beams back toward the output mirror to a point on the exterior surface of the mirror where the counter-propagating laser beam emerges so that a portion of the first laser beam, returned by the retro-reflector, is combined with the second laser beam, exiting the laser, to form a single beam. This single beam is then directed to a detector that measures the beat frequency of the combined beams during rotation.

Although suitable for combing the separate and diverging output beams of the ring laser, output beam combining apparatus employing retro-reflectors have their drawbacks. Typically the retro-reflector structure includes three polished surfaces oriented at right angles to one another within tolerances of a few arc seconds. Fabrication of this relatively complex structure is normally expensive, with the cost increasing as the size of the retro-reflector decreases.

Thus there exists a need for a less complex and more inexpensive output coupling apparatus for a ring laser. The present invention provides this device.

DISCLOSURE OF INVENTION

In general terms, the present invention provides an output beam combining apparatus for a ring laser that is considerably less complex and less expensive than a retro-reflector. The apparatus of the present invention combines the separated and diverging output beams of a ring laser into a single beam containing frequency information from each output beam. The present invention is also suitable for use in both planar and non-planar ring laser configurations.

More particularly, one presently preferred embodiment of the current invention includes a first planar mirror attached to the exterior surface of a ring laser output mirror and oriented perpendicular to the exterior surface of the output mirror, along with a second planar mirror that is attached to the first mirror in a perpendicular orientation with respect to the first mirror. One of the laser beams exiting the ring laser through the output mirror will reflect off the first planar mirror onto the second planar mirror and back towards the exterior surface of the ring laser output mirror along a path parallel to but displaced from the original beam exiting the ring laser. The first and second planar mirrors are positioned on the ring laser output mirror so as to reflect this first laser beam back to the point where the second counter-propagating beam in the ring laser exits the output mirror. The multiply reflected first laser beam is then reflected off of the exterior surface of the output mirror so as to be collinear with the second beam exiting laser, thus forming a single combined beam. This combined beam is directed to a suitable detector.

To reduce attenuation of the multiply reflected first laser beam, an anti-reflective coating may, but need not necessarily, be applied to the exterior surface of the output mirror in the region where this first laser beam emerges from the mirror. A partially reflective coating may, but need not necessarily, also be applied to the exterior surface of the output mirror in the region where the first laser beam reflects off of the output mirror and the second laser beam emerges from the mirror to maximize the beat signal of the combined beam. In an alternative embodiment of the present invention, the first and second mirrors are mounted on a pair of positioning blocks that are attached to the exterior surface of the output mirror.

The novel features of the present invention will be better understood from the following detailed description, considered in connection with the accompanying drawings. It should be understood, however, that the drawings are for purposes of illustration and description only and are not intended as a definition of the limits of the present invention.

DETAILED DESCRIPTION OF THE PREFERRED EMBODIMENT

Figure 1:
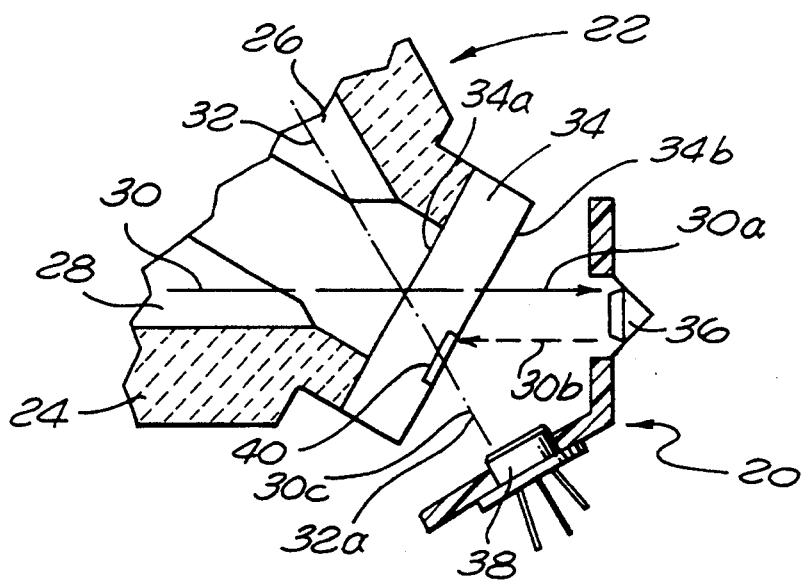
FIG. 1 is a top view of a prior art ring laser output beam combining apparatus.

An example of a conventional output beam combining assembly 20 is shown adjacent a ring laser 22 in FIG. 1. The ring laser 22 includes a body 24 having a pair of intersecting bores 26 and 28 within which a pair of collinear laser beams 30 and 32 travel in opposite directions about the ring laser 22. An output mirror 34 is disposed at the intersection of the bores 26 and 28. The counter-propagating laser beams 30 and 32 are only partially reflected off of an interior surface 34a of the output mirror 34 so that a portion of each laser beam exits the ring laser through the output mirror 34. As the counter-propagating beams 30 and 32 exit an exterior surface of the output mirror 34 the laser beams are spaced apart from one another and travel along diverging paths 30a and 32a.

The conventional output beam combining assembly 20 shown in FIG. 1 includes a retro-reflector 36 to return the exiting laser beam 30 to the exterior mirror surface 34b along a path 30b that is parallel to but spaced apart from the original exit path 30a. The return path 30b intersects the exterior mirror surface 34b at the exit point of the counter-propagating laser beam 32 so that the laser beam 30 is then reflected off of the exterior mirror surface 34b along a path 30c that is collinear with the exit path 32a of the counter-propagating laser beam 32.

The conventional output coupler 20 in FIG. 1 also includes a detector 38 for sensing a beat frequency between the two laser beams 30 and 32 during rotational motion of the ring laser 22. A partially reflective coating 40 may also be applied to the exterior mirror surface 34b.

Figure 2:
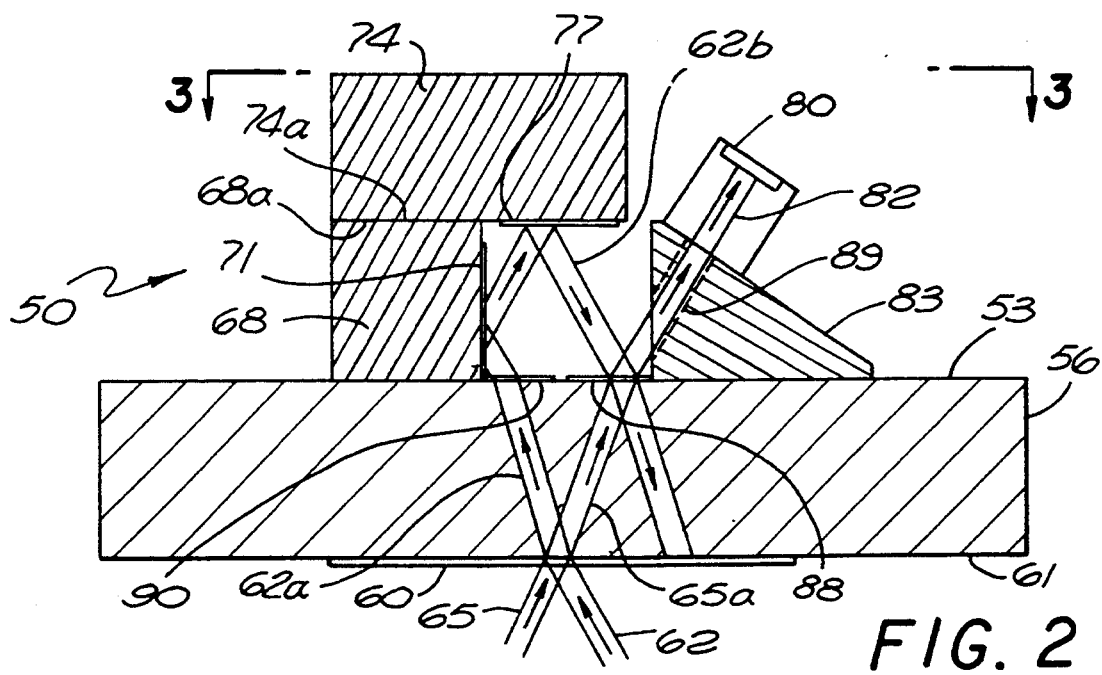
FIG. 2 is a side view of a first embodiment of the output beam combiner of the present invention.
Figure 3:
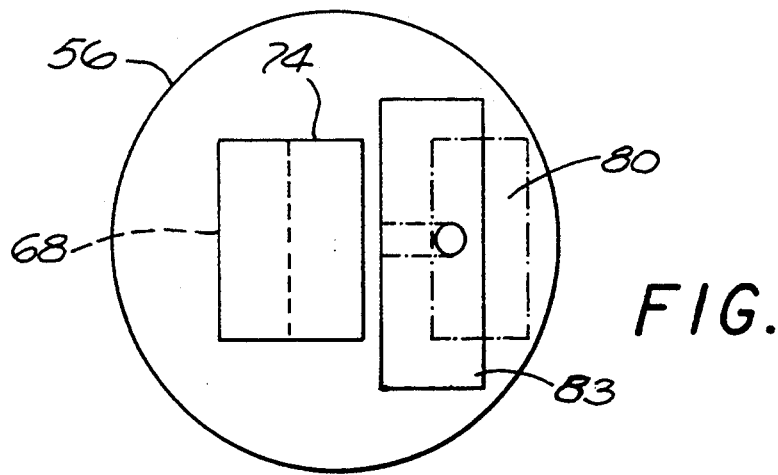
FIG. 3 is a top view of the first embodiment of the present invention illustrated in FIG. 2.

Referring to FIGS. 2 and 3 there is shown one presently preferred embodiment of the output beam combining apparatus 50 of the present invention. As illustrated, the output beam combiner 50 is mounted onto an exterior surface 53 of a mirror substrate 56. The substrate 56 has only a partially reflective coating 60 on an interior surface 56 so that a small portion of each of two counter-propagating laser beams 62 and 65 is transmitted through the substrate 56 to provide the output beams from the ring laser.

The output beam combiner 50 of the present invention includes a first planar mirror 68 mounted onto the exterior surface 53 of the mirror substrate 56. The mirror 68 has a flat reflective surface with an optical coating 71 oriented generally perpendicular to the exterior substrate surface 53. A second planar mirror 74 is attached to the first mirror 68 and has a flat reflective surface with a coating 77 that is oriented perpendicular to the flat reflective coating 71 on the first mirror 68. The perpendicular orientation of the first planar mirror 68 with respect to the second planar mirror 74 causes a light beam travelling in a plane normal to the flat reflective coatings 71 and 77 to be reflected along a path that is displaced from but parallel to the incident beam. A suitable optical detector 80 is also included and disposed adjacent the first and second mirrors 68 and 74. The detector 80 is affixed to the mirror substrate 56 by a support block 83.

The precise location of the first and second planar mirrors 68 and 74 on the exterior substrate surface 53 is selected so as to direct a reflection of the laser beam along a path 62b intersecting the exterior substrate surface 53 at the point where the other counter-propagating laser beam 65 exits the substrate 56 along a path 65a. Since the return path 62b is parallel to the initial laser beam 62 within the ring laser, the path of reflection for the laser beam 62 off of the exterior substrate surface 53 is collinear with the counter-propagating laser beam 65 emerging from the substrate 56 along the path 65a. Thus portions of both of the counter-propagating laser beams 62 and 65 form a collinear beam along the path 82 to the detector 80.

The reflected laser beam traveling along the path 62b is not entirely reflected off of the exterior surface 53 of the mirror substrate 56. A portion of this beam is also lost into the substrate 56. A partially reflective coating 88 may, but need not necessarily, be applied to the exterior surface 53 of the mirror substrate 56 to increase the intensity of the portion of the laser beam that is reflected off of the exterior substrate surface 53 along the path 82 by varying the intensities of the portions of the laser beams 62 and 65 forming the combined beam. This partially reflective coating, however, will also decrease the intensity of the laser beam exiting through the mirror substrate 56 along the path 65a. Thus appropriate selection of the partially reflective coating 88 can be employed to advantageously maximize the detected hetrodyne signal of the combined laser beam travelling along path 82. An anti-reflective coating 90 may, but need not necessarily, also be applied to the exterior surface 53 of the mirror substrate 56 in the region where the first laser beam 62 exits the substrate 56. This coating 90 will enhance the intensity of the portion of the laser beam 62 exiting the ring laser.

The applicant has determined that it is far simpler and considerably less expensive to fabricate two planar mirrors 68 and 74 and bond them together at right angles with sufficient accuracy to achieve a desired degree of collinearity in the combined output beam than to precisely polish the numerous reflecting surfaces common with conventional beam combining optics, such as those employing retro-reflectors. The second planar mirror 74 requires only one precisely flat surface, the side contacting the first planar mirror 68 and having the reflective coating 77. The first planar mirror 68 similarly requires only two accurate surfaces, the side 68a in contact with the second planar mirror 74 and the adjoining side with the reflective coating 71. Preferably these adjoining sides of the first mirror 68 are perpendicular to one another to within a few arc seconds.

The planar mirrors 68 and 74 may be made from any number of relatively inexpensive materials well known in the ring laser art. Preferably the mirrors 68 and 74 are made from materials having a low coefficient of thermal expansion such as, for example, ZERODUR (a trademark) a material widely used in the ring laser art. The reflective coatings 71 and 77 similarly may also be formed from any number of suitable materials well known in the laser art, such as, for example, enhanced aluminum.

The detector 80 may be any of several different types of optical detectors well known in the art for sensing the beat frequency between the laser beams 62 and 65 during rotation. The detector support 83 has a simple configuration that orients and positions the detector 80 on the mirror substrate 56 in the path of the combined laser beams. In the embodiment illustrated in FIGS. 2 and 3, the support 83 is provided with a bore 89 to accommodate the path 82 of the combined laser beams to the detector 80. Alternatively, however, the support 83 could be provided with a notch or groove to accommodate the beam path 82.

The output beam combiner 50 of the present invention may be assembled by bonding the planar mirrors 68 and 74 together and then affixing the mirrors 68 and 74 to the exterior surface 53 of the mirror substrate 56. The perpendicular orientation of the first mirror 68 with respect to the exterior substrate surface 53 need only be accurate to within a few degrees of arc due to the tendency of the combined mirrors 68 and 74 to reflect light beams parallel to an incident beam. Normally an optically curable adhesive, such as, for example, a UV curable adhesive, is used to secure the mirrors 68 and 74 to the exterior substrate surface 53. During final assembly the mirrors 68 and 74 and the detector 80, and the detector support 83, are placed on the exterior substrate surface 53 while the ring laser is in operation. The mirrors 68 and 74 and the detector 80 are then positioned on the exterior substrate surface 53 so to achieve an optimum output signal. The output beam combiner 50 is then illuminated with UV light to cure the adhesive and permanently affix the mirrors 68 and 74 and the detector 80 on the exterior substrate surface 53.

Figure 4:
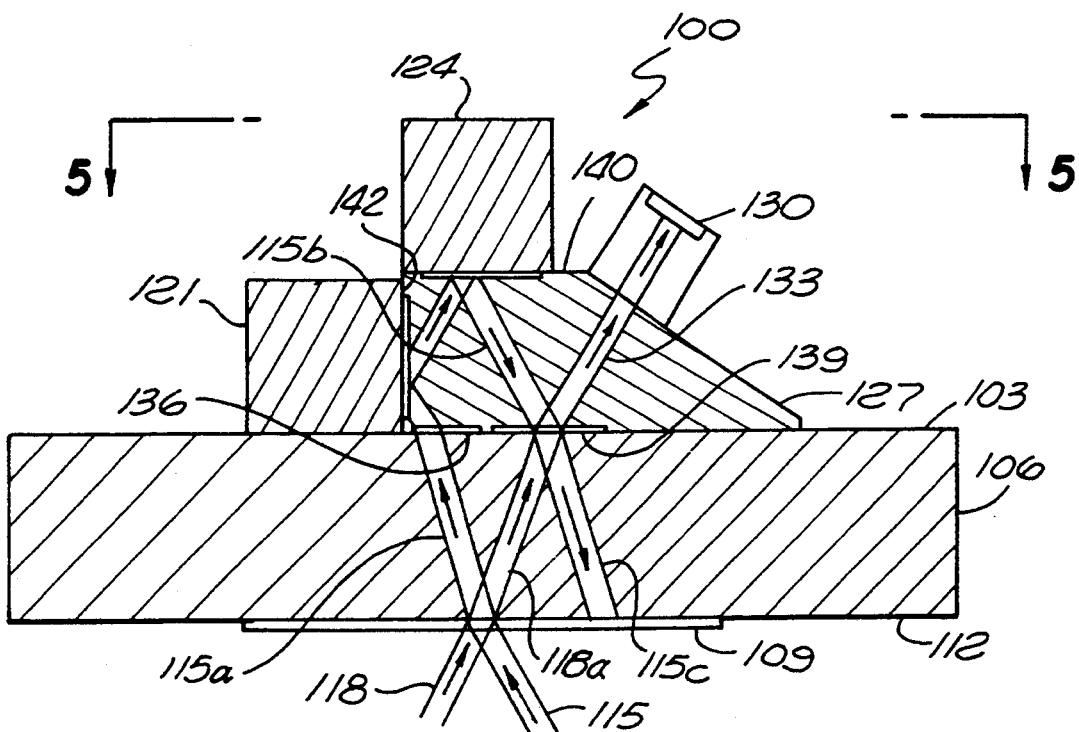
FIG. 4 is a side view of an alternative embodiment the present invention.
Figure 5:
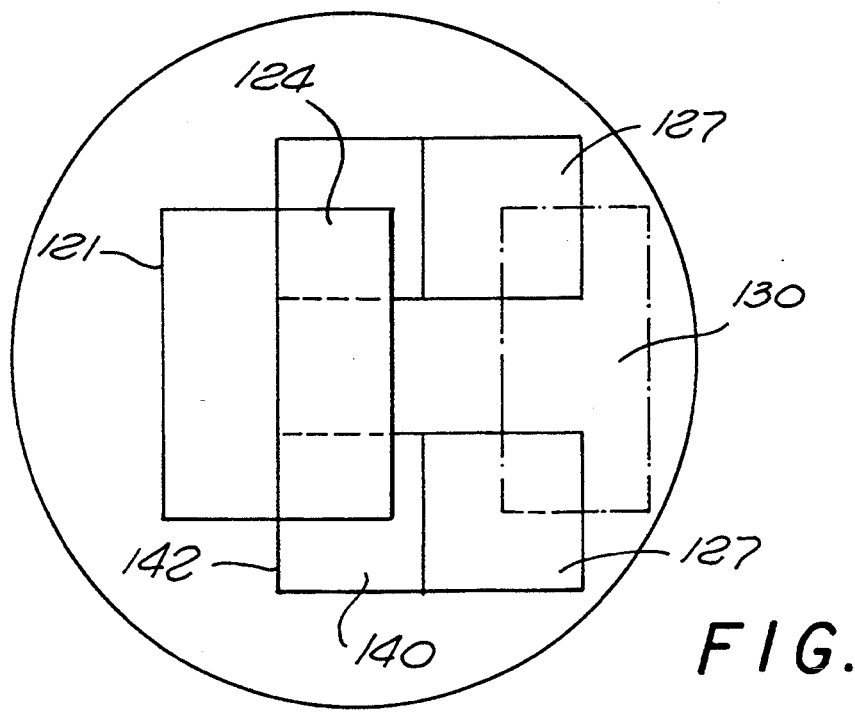
FIG. 5 is a top view of the alternative embodiment illustrated in FIG. 4.

In FIGS. 4 and 5 an alternative embodiment 100 of the optical coupler of the present invention is shown. This embodiment of the optical coupler 100 is also affixed to the exterior surface 103 of an output mirror substrate 106. As before, substantially all of two counter-propagating laser beams 115 and 118 are maintained within the ring laser by a reflective coating 109 applied to an interior surface 112 of the mirror substrate 106. A small portion of each of the counter-propagating beams 115 and 118, however, is also allowed to exit the ring laser along paths 115a and 118a, respectively.

The output beam combining apparatus 100 in FIGS. 4 and 5 includes a first planar mirror 121 and a second planar mirror 124 mounted on adjacent sides of a pair of support blocks 127. The mirrors 111 and 124 are attached to the blocks 127 so as to form a right angle with respect to one another. A suitable detector 130 is also attached to the support blocks 127. Because of the perpendicular orientation of the planar mirrors 121 and 124, the portion of the laser beam 115 that is transmitted through the mirror substrate 106 is reflected off of the mirrors 121 and 124 along a path 115b parallel to the incident beam 115 within the ring laser. The support blocks 127, along with the mirrors 121 and 123, are also positioned on the exterior surface 103 of the mirror substrate 106 so that the beam path 115b intersects the exterior surface 103 of the mirror substrate 106 at the point where a portion of the laser beam 118, transmitted along the path 118a, emerges from the mirror substrate 106. A portion of the multiply reflected laser beam travelling along the path 115b is then reflected off of the exterior substrate surface 103 along a path collinear with the portion of the laser beam 118 emerging from the substrate 106 along the path 118a. These two portions of the counter-propagating laser beams 115 and 118 thus form a combined beam along a path 133 that is directed to the detector 130.

An anti-reflective coating 136 may, but need not necessarily, be applied to the exterior substrate surface 103 in the region where the laser beam travelling along the path 115a exits the mirror substrate 106 in order to increase the intensity of the portion of the laser beam 115 reaching the detector 130. A partially reflective coating 139 may, but need not necessarily, also be applied to the exterior substrate surface 103 in the region where the beam 115b and beam path 118a intersect on the exterior substrate surface 103 so as to maximize the detected hetrodyne signal.

As in the previous embodiment, an appropriately reflective coating, such as enhanced aluminum, is preferably applied to the reflective surfaces of the planar mirrors 121 and 124. If the support spacers 127 are used to position the mirrors 121 and 124, only one surface on each planar mirror need be polished to an optically flat finish. Additionally, only the two adjoining surfaces 140 and 142 of the support blocks 127 are required to form a fairly precise right angle with respect to one another. These surfaces 140 and 142 respectively contact the planar mirrors 121 and 124.

The entire output coupler structure including the mirrors 121 and 124, the blocks 127 and the detector 130 can be mounted onto the exterior surface 103 of the mirror substrate 106 in any convenient manner. Thus, for example, it might be preferable for reasons of stability or rigidity to bond the planar mirror 121 to both the exterior substrate surface 103 and the support blocks 127. In any configuration, however, only the perpendicular orientation between the two mirrors 121 and 124 need be maintained to, preferably, within a few arc seconds tolerance. Accordingly, this embodiment 100 of the output beam combining apparatus of the present invention also provides an inexpensive structure for combining the exiting portions of the counter-propagating laser beams 115 and 118 over conventional output beam combining apparatus.

As discussed above, the output beam combining apparatus of the present invention provides a simpler and significantly less expensive apparatus for combining the separated and diverging laser output beams of a ring laser and providing a single beam having sufficient collinearity to allow measurement of a beat frequency during rotational motion. It will, of course, be understood that modifications to the above-described ring laser output beam combiner will be apparent to others skilled in the art. For example, the two planar mirrors of the output coupler could be configured in a number of ways to achieve the desired level of perpendicularity in their orientation without departing from the spirit of the present invention. Accordingly, the scope of the present invention is not limited by the particular embodiments described above, but is defined only by the claims set forth below and equivalents thereof.

What is claimed is:

1. An output beam combining apparatus for combining a first and a divergent second laser beam exiting a ring laser output mirror, comprising:
    a support block attached to the output mirror and having a first side and an adjacent second side;
    a first planar mirror attached to the first side of the support; and
    a second planar mirror attached to the second side of the support and oriented perpendicular to the first planar mirror, wherein the first laser beam is reflected off of the first and second planar mirrors and an exterior surface of the output mirror collinearily with the second laser beam to form a single combined beam including a portion of said first laser beam and a portion of said second laser beam.

2. The output beam combining apparatus of claim 1 wherein said first and second planar mirrors are blocks of materials having a polished surface with a reflective coating.

3. The output beam combining apparatus of claim 1 wherein said reflective coatings are enhanced aluminum.

4. The output beam combining apparatus of claim 1 wherein said first and second planar mirrors are made of a material having a low coefficient of thermal expansion.

5. The output beam combining apparatus of claim 1 further comprising a partially reflective coating applied to an exterior surface of the output mirror at an exit point of the second laser beam from the output mirror.

6. The output beam combining apparatus of claim 1 further comprising an anti-reflective coating applied to the exterior surface of the output mirror at an exit point of the first laser beam from the output mirror.

7. The output beam combining apparatus of claim 1 further comprising a detector, attached to the support block and responsive to a beat frequency between said first and second laser beams.

8. The output beam combining apparatus of claim 1 wherein said support means is made of a material having a low coefficient of thermal expansion.

9. An output beam combining apparatus for combining a first and a second laser beam exiting a ring laser through an output mirror, comprising:
   a first mirror block attached to an exterior surface of the output mirror and having a first reflective surface oriented generally perpendicular to said output mirror exterior surface;
   a second mirror block attached to said first mirror block and having a second reflective surface oriented perpendicular to said first reflective surface, wherein said first laser beam is reflected off of said first and second mirror blocks so as to form a collinear beam including portions of said first and second laser beams.

10. The output beam combining apparatus of claim 9 wherein said first reflective surface is coated with enhanced aluminum;

11. The output beam combining apparatus of claim 9 wherein said second reflective surface is coated with enhanced aluminum;

12. The output beam combining apparatus of claim 9 further comprising a partially reflective coating applied to the output mirror exterior surface where the first and second laser beams intersect.

* * * * *